United States Patent [19]

Morota et al.

[11] 4,295,618
[45] Oct. 20, 1981

[54] DEVICE FOR FIXING PIPES, RODS AND OTHER ELONGATED BODIES

[75] Inventors: Kazutoshi Morota, Fujisawa; Takuo Yuda, Yokohama, both of Japan

[73] Assignees: Nissan Motor Co., Ltd.; Nifco, Inc., both of Yokohama, Japan

[21] Appl. No.: 93,389

[22] Filed: Nov. 13, 1979

[30] Foreign Application Priority Data

Nov. 15, 1978 [JP] Japan .................. 53-156074[U]

[51] Int. Cl.³ .............................................. F16L 3/08
[52] U.S. Cl. ...................... 248/73; 248/68 R; 248/74 B; 248/74 PB
[58] Field of Search .............. 248/68 R, 73, 74 A, 248/74 B, 74 PB; 24/73 AP, 73 DB, 73 SA, 257 R

[56] References Cited

U.S. PATENT DOCUMENTS

| | | | |
|---|---|---|---|
| 3,032,603 | 5/1962 | Whitley | 24/73 SA X |
| 3,077,018 | 2/1963 | Cochran | 24/73 SA |
| 3,369,785 | 2/1968 | Moore | 248/68 R |
| 3,894,706 | 7/1975 | Mizusawa | 248/73 X |
| 3,944,177 | 3/1976 | Yoda | 248/74 PB |

FOREIGN PATENT DOCUMENTS 314249  6/1956  Switzerland ................ 248/74 A

*Primary Examiner*—William H. Schultz
*Attorney, Agent, or Firm*—Trexler, Bushnell & Wolters, Ltd.

[57] ABSTRACT

A device for fixing a pipe, rod or other elongated object to a panel etc. which constitutes a part of an automobile etc. In use a fixing device according to this invention is finger-pushed to put it in a provisionally fixed position in which said elongated object is free to move lengthwise, thus permitting, for instance, the tightening of said elongated body. Then, the fixing device is again finger-pressed to put in it in a final and completely fixing position.

3 Claims, 7 Drawing Figures

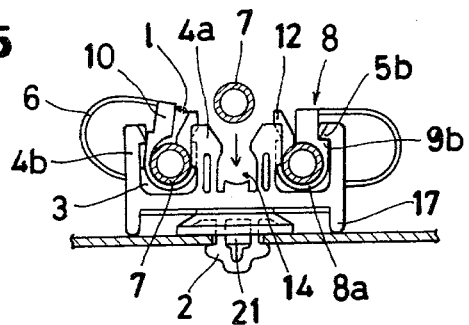
Fig_5
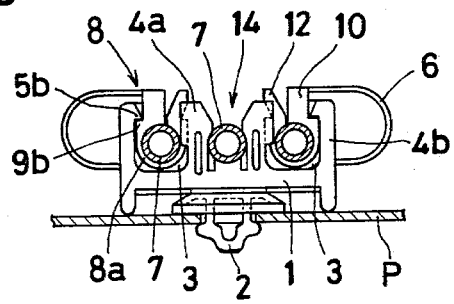
Fig_6
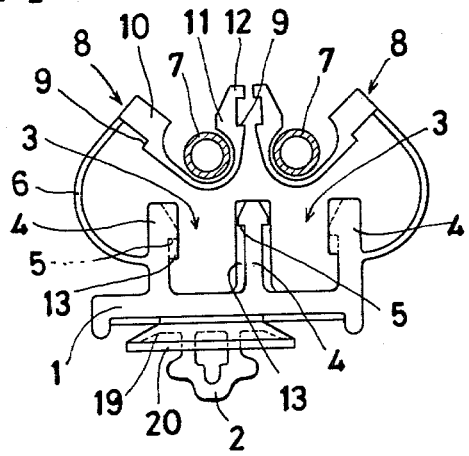
Fig_7

DEVICE FOR FIXING PIPES, RODS AND OTHER ELONGATED BODIES

BACKGROUND OF THE INVENTION

This invention relates to a device for fixing pipes, rods and other elongated bodies to panels, plates etc. constituting part of, for example, an automobile or other vehicle, an electric appliance, a machine or device, or a structural member of a building.

One of the inventors of the present invention previously proposed a fixing device of this type which, as shown in U.S. Pat. No. 3,944,177, includes a U-shaped housing portion provided on the top side of a base plate having an anchor for fixing the device to a panel etc. The previously proposed device further has a V-shaped fitting portion provided above the housing portion of the base plate to receive the pipe, rod or other object to be fixed. After the object has been placed into the V-shaped fitting portion, this portion is pressed into the housing portion and held in this position by the engagement between engaging projections on the housing portion and engaging pawls of the V-shaped fitting portion.

In use, this prior fixing device is first fixed to the panel by its anchor and the object to be fixed is then inserted into the V-shaped fitting portion. Thereafter, the V-shaped fitting portion, together with the object fitted therein, is pressed down into the housing portion to complete the fixing operation. This arrangement is advantageous in that it allows the object to be fixed easily and without fear of its being marred and in that the housing portion can be formed of thick material so as to assure strong holding force.

On the other hand, the provision of a thick housing portion has a tendency to impair operability since a greater pushing force is required to press the object into the housing. Moreover, the stronger holding force attained in this way means that it is not easy to release the grip of the fixing device on the object when it is necessary or desirable to take up slack that has developed therein. Another problem is that when a force is applied to the object in the longitudinal direction, there is a fair chance that the V-shaped fitting portion will slide within the housing and become detached therefrom.

One object of this invention is to provide a fixing device which is free of the defects of the prior art device but which retains the advantages thereof, namely a fixing device which has good operability even in the case where the holding force is made large and is capable of holding the object to be fixed in a provisionally fixed state prior to final fast fixing thereof.

Another object of this invention is to provide a fixing device for pipes, rods etc. wherein there is no danger of the fitting portion coming detached from the housing portion as a result of a force applied to the object to be fixed in the longitudinal direction thereof.

SUMMARY OF THE INVENTION

To attain these objects, the present invention provides an improvement in a device for fixing pipes, rods and other elongated bodies to a panel, comprising a base plate, an anchor provided on the underside of the base plate for fixing the device to the panel, a U-shaped housing portion provided on the top side of the base plate and a foldable fitting portion provided above the U-shaped housing portion wherein the object to be fixed is received in the fitting portion and the foldable fitting portion is pressed into the housing portion thereby causing a pair of engaging projections provided on the housing portion to engage with a pair of engaging pawls provided on the fitting portion, wherein the improvement resides in the members of the pair of engaging projections being provided at mutually different levels on the housing portion and/or the members of the pair of engaging pawls being provided at mutually different levels on the fitting portion.

In this arrangement, with the engaging projections and/or engaging pawls pairs being provided at different levels, the projection and pawl on one side can be engaged to provisionally fixed the object so that the state in which it is held can be adjusted. Moreover, since the second projection and pawl pair are brought into engagement after engagement of the first pair, fast engagement can be attained with ease. Still further, a stopper is provided in the housing portion so that after the object has been fixed, there is no danger that a pulling force exerted in the longitudinal direction thereof will cause the fitting portion to detach from the housing portion.

The invention will be better understood from the following description which is made with reference to the accompanying drawings.

BRIEF EXPLANATION OF THE DRAWINGS

FIG. 5 is a front view of the fixing device of FIG. 2 showing the lefthand side in provisionally fixed state and the righthand side in fully fixed state.

FIG. 6 is a front view of the fixing device of FIG. 2 shown with three objects fixed thereby.

FIG. 7 is a front view of another embodiment of this invention.

DESCRIPTION OF THE PREFERRED EMBODIMENT

Figure 1:
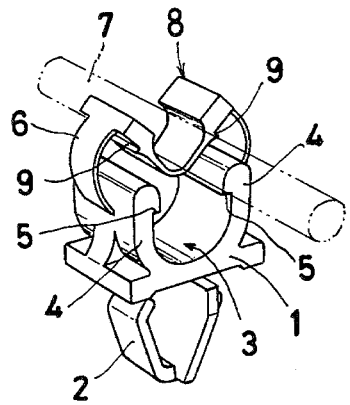
FIG. 1 is a perspective view of a conventional fixing device.
Figure 2:
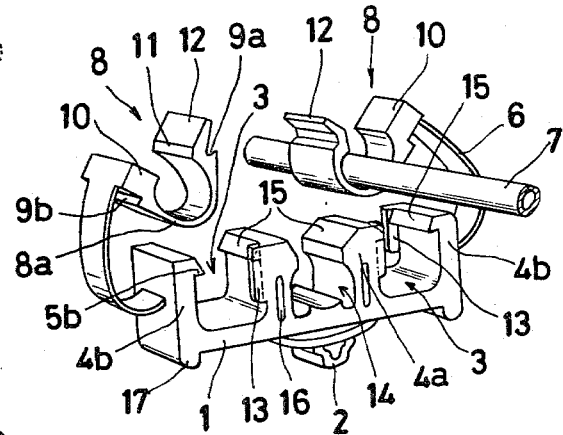
FIG. 2 is a perspective view of one embodiment of a fixing device according to the present invention.
Figure 3:
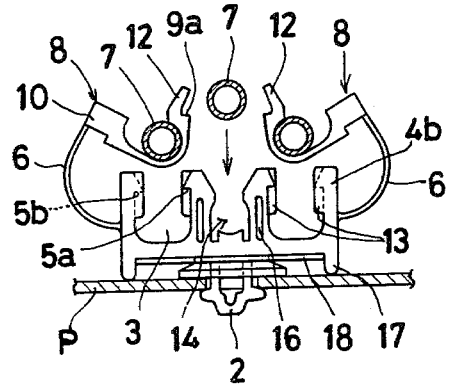
FIG. 3 is a rear view of the fixing device of FIG. 2.
Figure 4:
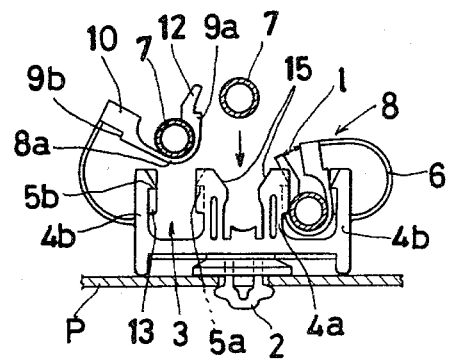
FIG. 4 is a front view of the fixing device of FIG. 2 shown with an object to be fixed provisionally fixed in the righthand housing portion thereof.

Referring to FIG. 1 there is shown a fixing device of U.S. Pat. No. 3,944,177. As shown, a base plate 1 has an anchor 2 for fixing the device to a panel etc., and a pair of parallel extending vertical walls 4 are provided on the top side of the base plate 1 so as to form an upward diverging U-shaped housing portion. An engaging projection 5 is provided on the upper part of the inner surface of each vertical wall 4 in such a way that the engaging projections on the vertical walls extend towards each other. A flexible supporting portion 6 extends from the outer surface of each vertical wall 4, and the opposite flexible supporting portions 6 support a V-shaped fitting portion 8 above the housing portion 3. An engaging panel 9 is formed on the outer surface of each end of the fitting portion 8. Thus, when a pipe, rod or other object to be fixed 7 is put in the fitting portion 8 and when the fitting portion is folded and pushed in the housing portion 3, the engaging pawls 9 will be brought into engagement with the engaging projections 5, thereby fixing the object to a panel etc. to which the fixing device is anchored.

In fixing an object 7 to a panel etc. with the conventional clamping device, first, the device is fixed to the panel etc. by the anchor 2 of the device, and then the object 7 is laid above the fitting portion 8 of the device, and is put in the fitting portion 8. The fitting portion 8 is folded and pushed in the housing portion 3, and then the engaging pawls 9 are caught by the engaging projections 5, thereby positively holding the object. Thus, the object can be easily fixed without any fear of marring the object. Also, the object-holding force can be advantageously raised by increasing the thickness of the vertical wall.

In folding and pushing the fitting portion 8 with an object 7 into the housing portion 3, however, the engaging pawls 9 on the opposite ends of the fitting portion 8 are liable to catch the engaging projections 5 on the inner surfaces of the vertical walls 4 at the same time, thereby causing the associated engaging portions to exert a pushing force on each other under the resilience of the vertical walls. In this connection if the thickness of the vertical wall is increased in the hope of raising the holding force generated within the vertical wall, the pushing force which must be applied to the fitting portion will accordingly increase, and hence the fixing work is made less easy. Disadvantageously once a length of a flexible object 7 such as a length of wire has been held by the device, the object cannot be easily released and tightened to take up the slack in the wire, because the engaging pawls 9 are difficult to release from the engaging projections 5 due to the strong holding force of the device. Still another disadvantage is, if one of the engaging pawls 9 should be caught by the counter projection 5 in the course of pushing the fitting portion and the object into the housing portion, it is difficult for the other engaging pawl 9 to catch the counter projection 5.

When an object is held by the device, the fitting portion 8 of the device is pushed against the vertical walls 4, and this position is kept only by the engagement of the pawls 9 with the counter projections 5. Therefore, if an undesired force is longitudinally applied to the object, the fitting portion 8 is liable to displace in the housing portion 3, and the fitting portion 8 may slip out of the housing portion of the device.

The object of this invention is to provide an improved fixing device which is guaranteed free of the defects of the conventional fixing device, but still retains the advantages thereof.

A preferred embodiment according to this invention will be described below with reference to FIGS. 2 to 6. A fixing device according to this invention is molded from synthetic resin or hard rubber. The fixing device as shown in FIGS. 2-6, is so formed that three pipes, rods or other elongated objects 7 may be held on the top surface of a base plate 1, which is anchored to a panel, frame etc.

An anchor 2 is provided on the bottom surface of the base plate 1. The anchor 2 is used to fix the device to a panel "P" which constitutes a part of an automobile etc. Four parallel extending vertical walls 4a, 4b are provided on the top surface of the base plate 1. Two housing portions 3 are defined by the two pairs of vertical walls 4a, 4b. Also, a stationary fitting portion 14 which is adapted to hold a single object 7, is defined by the inner and adjacent vertical walls 4a.

Two engaging projections 5a and 5b are provided on the upper ends of the inner sides of the opposite vertical walls 4a, 4b at the same level from the top surface of the base plate 1. Two flexible supporting portions 6 extend from the outer sides of the outermost vertical walls 4b.

Each of the flexible supporting portions 6 has a foldable fitting portion 8 (C-shape in this embodiment) integrally connected to the tip end of the supporting portion 6, thereby suspending the "C"-shaped fitting portion 8 above each housing portion 3. The joint end 10 and the free end 11 of the "C"-shaped fitting portion 8 are thicker than the remaining part, and the tip end of the flexible supporting portion 6 is integrally connected to the joint end 10 of the fitting portion. A finger-catch portion 12 is provided on the free end of the "C"-shaped fitting portion, and the inner side of the finger-catch portion is planed off to provide an inclined surface. The joint end 10 and the free end 11 of the "C"-shaped fitting portion 8 are connected by a thin strip 8a, and the distance from the joint end 10 to the center of the "C"-shaped curve is longer than the distance from the free end 11 to the center in the stress-free condition. Thus, when the "C"-shaped fitting portion 8 is folded to wrap an object to be fixed, the thick joint and free ends 10 and 11 are brought towards each other.

Engaging pawls 9a and 9b are provided on the outer sides of the joint and free ends 10 and 11 of the "C"-shaped fitting portion, respectively. It should be noted that the engaging pawl 9a on the outer side of the free end of the fitting portion is at a level lower than the engaging pawl 9b on the outer side of the joint end when the fitting portion embracing the object 7 is brought in the position in which they are pushed in the housing portion 3.

In this particular embodiment a stopper 13 is provided on one side of each of the vertical walls 4a and 4b. The stopper 13 extends in the space of the housing portion 3, thus preventing the fitting portion 8 from slipping out of the housing portion 3 when the object embraced by the fitting portion is pulled lengthwise. In the provisionally fixing position in which only the engaging pawl 9a is caught by the counter projection 5a with the fitting portion 8 around the object, the joint end 10 of the fitting portion 8 is apart from the free end 11 by the distance "l" (See FIG. 5). The provisionally fixed position cann be easily released by pushing the finger-catch portion 12 towards the joint end 10 of the fitting portion and raising the fitting portion.

In the embodiment as shown, the upper ends of the vertical walls 4a and 4b are planed off to provide inclined surfaces 15 with respect to the spaces of the housing portions 3 and the stationary fitting portion 14, thereby making it easy to push the "C"-shaped fitting portions embracing the objects in the housing portions and the object alone in the stationary fitting portion. The inner and adjacent vertical walls 4a have slots running the entire length of the wall to improve the resilience thereof. A reinforcement rib 17 is provided on the bottom surface of the base plate below along each of the outermost vertical walls 4b. Also, a reinforcement cross rib 18 is provided to connect the centers of the opposite longitudinal reinforcement ribs 17, thus increasing the stiffness of the base plate 1. A flange 19 is provided on the feet of the anchor 2, and a rubber washer 20 is put on the flange 19, thereby assuring liquid-tightness at an opening 2 of the panel "P" in which the anchor 2 of the device is fitted.

In fixing a pipe, rod or other elongated object 7 to a panel "P" which constitutes a part of an automobile etc. with a fixing device according to the embodiment as described above, first, the anchor 2 of the device is inserted in an aperture 21 of the panel "P" to fix the device on the panel "P", and then an object 7 is laid in each "C"-shaped fitting portion 8. The object is pushed down, thereby causing each "C"-shaped fitting portion to fit in the associated housing portion 3, and allowing the engaging pawls 9a and 9b to catch the engaging projections 5a and 5b, respectively. The engaging pawl 9a is positioned at a level which is lower than the engaging pawl 9b, and therefore the engaging pawl 9a is caught by the engaging projection 5a on the inner side of the vertical wall 4a, thus putting the object in condition for provisional fixing. By pushing down the object from the provisionally fixing position a relatively short length of thin strip extending from the joint end 10 is yieldingly bent on the object, and then the joint end 10 is pulled into the space of the housing portion 3 until the engaging pawl 9b on the outer side of the joint end is brought into engagement with the counter engaging projection 5b, thus completing the fixing of the object 7 to the panel "P".

If it is desired that the provisionally fixed position be released, one only has to push the finger-catch 12 at the tip end of the "C"-shaped fitting portion 8 toward the joint end 10, and then pull it up. Thus, the provisionally fixed position can be easily released without using any tool such as a screw driver. If it is desired to release the object from the fixing device in the position of positively holding the object with the engaging pawls 9a and 9b in engagement with the counter engaging projections 5a and 5b, first the fixing device is brought into the provisionally fixing position by disengaging the engaging pawl 9b from the counter engaging projection 5b with a screw driver etc., as is the case with the conventional fixing device, and then the object is released from the fixing device by releasing the object from the provisionally fixed position according to the procedure mentioned above or with a screw driver etc.

In a fixing device according to this invention, different from the conventional fixing device, the opposite engaging pawls of the fitting portion are not be brought in engagement with the counter engaging projections at the same time, but the device is brought in the provisionally fixing position in which one of the opposite engaging pawls 9a is caught by the counter engaging projection 5a, and then the device is brought into the completely fixed position in which both of the engaging pawls 9a and 9b are caught by the counter engaging projections 5a and 5b. The deformation of the "C"-shaped fitting portion 8 which is caused by engagement of the lower engaging pawl with the counter engaging projection cannot be adversely influenced by the opposite side of the fitting portion on which the upper engaging pawl is provided. Therefore, the engaging pawls 9a and 9b can go over the engaging projections 5a and 5b to be caught thereby by pushing the engaging pawls 9a and 9b with a relatively weak force, thus accordingly expediting the fixing work. Also, the fixing device according to this invention is guaranteed free from the adverse position in which the pre-engagement of one engaging pawl with the counter engaging projection hinders the post-engagement of the other engaging pawl with the counter engaging projection, as is the case with the conventional fixing device.

In fixing an elongated flexible object 7, it is held in the provisionally fixing position, and the object is tightened to take up the slack of the object, and finally the object held tightly is locked in the completely fixing position. That is to say, even an elongated flexible object can easily and firmly fixed in a desired state with the fixing device according to the present invention.

Thanks to the stoppers 13 provided on the vertical walls 4a and 4b, if an elongated object 7 which is embraced by the fitting portion 8 and is in the housing portion 3 of the device, should be pulled lengthwise, the fitting portion 8 cannot be pulled out of the housing portion 3 to release the object 7 from the device. In the embodiment mentioned above the opposite engaging pawls 9a and 9b are provided on the outer sides of the joint and free ends 10 and 11 of the fitting portion at different levels, thereby permitting the provisional hold from which the object can be easily released. Alternatively the engaging projections 5a and 5b may be provided on the vertical walls 4a and 4b at different levels (FIG. 7). Otherwise, the engaging pawls 9a and 9b and the engaging projections 5a and 5b may be at different levels.

The embodiment described above is shown as capable of fixing three pipes, rods etc. to a panel "P". This invention, however, can be equally applied to a fixing device which is capable of fixing a single object 7 as shown in FIG. 1. An embodiment according to this invention which is capable of fixing two elongated objects 7 is given in FIG. 7. This invention can, of course, also be applied to fixing devices which are capable of fixing four or more elongated objects.

What is claimed is:

1. In a device for fixing a tube, rod or other elongated object comprising a base plate, an anchor provided on the bottom surface of said base plate, at least two vertical walls provided on the top surface of said base plate and standing thereon parallel to each other to define at least one upward diverging "U"-shaped housing portion, a pair of opposite engaging projections provided on the upper parts of the inner surfaces of each pair of adjacent vertical walls defining each said housing portion, a foldable fitting portion which is adapted to embrace the object to be fixed, a flexible supporting portion extending from one of said two adjacent vertical walls and connected to said foldable fitting portion for thereby supporting said foldable fitting portion above said housing portion, and a pair of engaging pawls provided on the outer sides of the opposite ends of said fitting portion, thus permitting said device to positively hold said object through engagement of said engaging pawls with said engaging projections when said fitting portion embracing said object is pushed into said housing portion, the improved device having the members of at least one pair selected from said pair of engaging projections and said pair of engaging pawls provided at different levels thereby making it possible to bring said device to a provisionally fixing position in which one of said engaging pawls is caught by the counter engaging projection when said fitting portion embracing said object is partly pushed in said housing portion, and making it possible to bring said device to a final and completely fixing position when the other engaging pawl is caught by the counter projection when said fitting portion embracing said object is completely pushed in said housing portion.

2. A fixing device according to claim 1 wherein said fitting portion has a joint end connected to said flexible supporting portion and a finger-catch provided on the tip end of said fitting portion.

3. A fixing device according to claim 1 wherein each of said vertical walls has a stopper to prevent said fitting portion from slipping off from said housing portion when said object embraced by said fitting portion in said housing portion is pulled lengthwise.

* * * * *